United States Patent [19]
Duffy

[11] 3,767,308
[45] Oct. 23, 1973

[54] METHOD AND APPARATUS FOR SENSING SURFACE DISPLACEMENT ORTHOGONAL TO THE LINE OF SIGHT

[75] Inventor: Donald E. Duffy, Syracuse, N.Y.

[73] Assignee: General Electric Company, Syracuse, N.Y.

[22] Filed: Jan. 12, 1972

[21] Appl. No.: 217,360

[52] U.S. Cl. ............... 356/109, 356/106, 356/110, 356/32, 356/163, 356/164
[51] Int. Cl. ............................................. G01b 9/02
[58] Field of Search ................... 356/106, 109, 110, 356/32, 163, 164, 172, 237

[56] References Cited
UNITED STATES PATENTS

| | | | |
|---|---|---|---|
| 3,661,465 | 5/1972 | Groh | 356/172 X |
| 3,619,064 | 11/1971 | Brooks et al. | 356/109 |
| 3,592,548 | 7/1971 | Majkowski | 356/109 X |
| 2,470,877 | 5/1949 | Stuland | 356/163 |

Primary Examiner—David Schonberg
Assistant Examiner—Paul K. Godwin
Attorney—Richard V. Lang et al.

[57] ABSTRACT

A novel method and apparatus for sensing surface displacement of an object orthogonal to the line of sight is described. The object is illuminated from a single laser source and imaged by a common lens using two laterally displaced apertures. Two successive images are obtained in this manner and are superimposed. The displacement is displayed as a pattern of moire' fringes or bands over the image. Increasing the moire' contrast is achieved by spatial filtering. The invention has application to measuring object displacement or distortion under both static and vibratory conditions.

10 Claims, 3 Drawing Figures

METHOD AND APPARATUS FOR SENSING SURFACE DISPLACEMENT ORTHOGONAL TO THE LINE OF SIGHT

BACKGROUND OF THE INVENTION

1. Field of the Invention

The present invention relates to the art of measuring fine displacements and surface distortions with coherent light and more particularly to measurements of displacements and distortions occurring orthogonal to the line of sight or in the plane of the object's surface, where the surface is orthogonal to the line of sight.

2. Description of the Prior Art

It is known that measurements of the change in the surface of an object can be made by observing the moire pattern produced by the change in one of two overlapping grid patterns that have been superimposed on the object. The measurement of out-of-surface displacement is made by imaging or projecting a grid structure on the object, after which the object is photographed. After the object undergoes some type of distortion a second photograph is made and when this pattern is compared to the first, a moire beat is obtained.

Present techniques for measurement of in-plane displacement require affixing a grid structure to the surface, either by etching or painting the grid on the surface, or by coating the surface with a light sensitive material and exposing it to a grid-pattern. This pattern is then compared to the pattern produced on the object after it undergoes some type of distortion. In this method, the preparation and handling of the object can be both time consuming and inconvenient.

Holographic techniques can be used to detect in-plane displacement; however, considerable data reduction of several separate fringe patterns is required.

More recently it has been proposed that the speckle pattern, which occurs in the image of an object illuminated with coherent light, can be used to measure in-plane displacement of the surface with interferometric sensitivity. In this method, the object is illuminated simultaneously with two coherent laser beams displaced symmetrically about the normal to the surface. Any path differences between the two beams are within the coherence length of the laser. A photographic plate is then doubly exposed to the speckle pattern image of the object and, between exposures, the plate is given a small displacement in its own plane. The resultant negative is then illuminated to produce its optical Fourier transform and, when appropriate spatial filtering is applied, speckle correlation fringes occur which are indicative of surface area displacements.

Applicant's method of in-plane measurement avoids the need for a second laser source so that coherence requirements are minimized, and avoids the need for accurate displacement of the photographic plate between exposures.

SUMMARY OF THE INVENTION

Accordingly, it is an object of the present invention to provide an improved apparatus for sensing in-plane displacement or distortion of an object's surface.

It is another object of the present invention to provide an improved method for sensing in-plane displacement or distortion of an object's surface.

It is still another object of the invention to provide a new apparatus and method for sensing in-plane displacement of an object having a sensitivity approaching that of interferometric techniques while also permitting relatively coarse measurements.

It is an additional object of the present invention to provide a new apparatus and method for creating an image of a distorting object illustrating the magnitude and character of the distortion.

It is another object of the invention to provide a new apparatus and method for sensing in-plane displacement of an object requiring only a single laser source and simplified optics for sensing in-plane object distortion.

It is a further object of the invention to provide apparatus and a method for spatially filtering the moire image indicating object distortion to improve the contrast of the moire bands.

These and other objects of the invention are achieved in a novel method for sensing surface displacement of an object orthogonal to the line of sight comprising the steps of illuminating said object from a single source of coherent light so as to produce a speckled image of the surface when the object is imaged in a predetermined direction. The lens is placed in said predetermined direction so as to image the surface in a viewing plane. The lens is then apertured with a mask containing two parallel slits, with a predetermined spacing and orientation, so as to produce precise superposition of the two speckled images formed by the two different regions of the imaging lens in the viewing plane. The superimposed images create interference gratings in the individual speckles of the composite image having a predetermined spatial frequency. Successive grated speckle images are then obtained before and after surface displacement. When these images are super-imposed with the gratings in individual speckles overlapping, moire bands representing displacement of the surface are formed.

When the foregoing method is practiced, the moire bands represent not only the magnitude of the distortion but also the character of the distortion. When the object is in vibratory motion, the vibration is shown.

In accordance with a second aspect of the invention, one may enhance the contrast between the light and dark moire fringes of the image by recording the superimposed images on a transparency, illuminating the transparency by a narrow band, point source of light, and spatially filtering this illuminated transparency to remove the zero and low spatial frequency components as determined by the dimensions of the slit opening used in recording the transparency, but passing the first and higher order frequencies due to the speckle gratings, as determined by the separation of the two slits.

In accordance with another aspect of the invention, the apparatus suitable for performing the foregoing method is described, employing a single laser source, and an imaging lens, and a mask with two spaced parallel slits. These elements form a grated speckled image of the distorted object. When the lens is a component of a camera, the viewing plane being the film plane, one may obtain moire patterns directly from the camera. The contrast of the moire fringe patterns may be increased by redirecting light from the same laser source into a projection viewer through a spatial filter.

BRIEF DESCRIPTION OF THE DRAWING

The novel and distinctive features of the invention are set forth in the claims appended to the present application. The invention itself, however, together with further objects and advantages thereof may be best understood by reference to the following description, and accompanying drawings in which:

Figure 1:
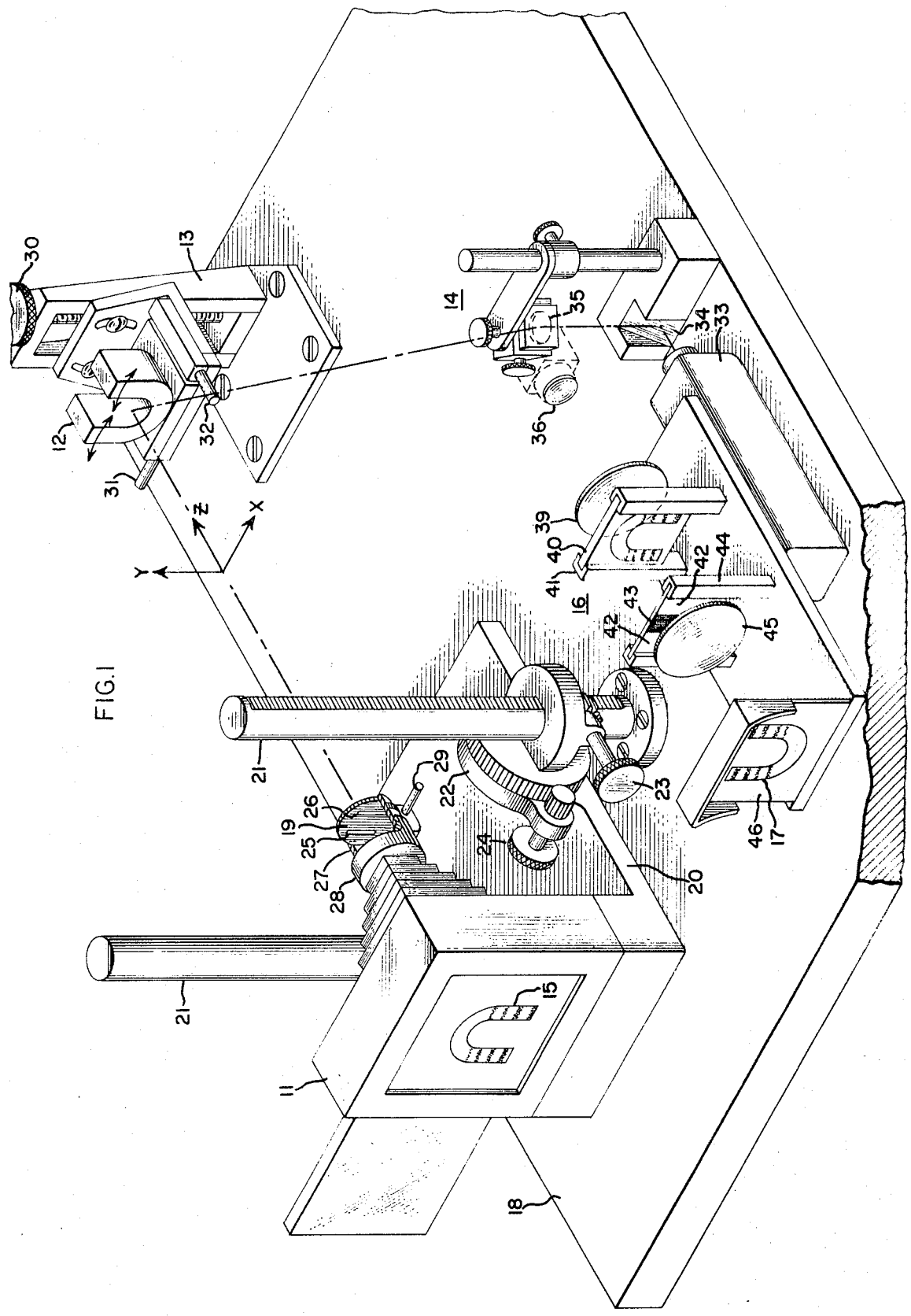
FIG. 1 is an illustration in perspective of apparatus for sensing in-plane displacement of the surface of an object.

DESCRIPTION OF THE PREFERRED EMBODIMENT:

Referring now to FIG. 1, there is shown an embodiment of the invention for viewing the surface displacement of a distorted object orthogonal to the line of sight and in the plane of the surface. In FIG. 1 there is shown a plate camera 11 equipped for direct viewing and for making a photographic recording of the displacement. The distorted object 12 is shown supported on a stand 13, and a laser illuminating system is shown at 14. A visual image of the displacement may be obtained by several methods. One method includes use of the camera view finder as shown at 15. Another method involves use of the projection viewer illustrated schematically at 16. The image 17 obtained from the projection viewer 16 has been spatially filtered to increase the contrast, but otherwise resembles the view provided by the camera view finder at 15.

The foregoing equipment is supported upon the large rigid table 18. The camera 11 and an adjustable lens mounted mask 19 are supported upon an elevating and tilting base plate 20. As seen in the drawing, an elevating mechanism, including a pair of elevating columns 21, firmly supported on the table 18, is provided for raising and lowering the base plate. In addition, the base plate is provided with a pair of flat bearing surfaces 22 which provide a rotating attachment of the base plate 20 to the vertical columns 21. Elevation of the base plate and tilting of the base plate is achieved by operation of the two hand controls 23, 24, respectively. The bearings 22 permit the axis of the camera to be tipped upward, to lie in a horizontal plane, or to be tipped down with the camera directed at an object placed underneath. The construction of the camera base plate 20 and the columns 21 should be substantial for rigidity and the adjustments should be provided with locking means. The columns should be sufficiently tall to permit approximately a meter's distance between the camera and the table top when the camera is tipped down.

As indicated, the mask 19 is mounted upon the barrel of the camera in front of the lens. The mask is opaque containing a pair of spaced slits shown at 25, 26 in the partially cut away view of FIG. 1. The mask is supported in a rotating sleeve 27, rotating within a stationary collar 28. The collar 28 is then attached to the lens barrel. The slitted mask may be rotated about the axis of the camera by means of the actuating knobs 29. The slits 25, 26 are elongated rectangular openings arranged with their major axes parallel and of a length to extend across the field of the camera lens. Their width and spacing dimensions will be discussed below. The slits 25, 26 may be rotated from the illustrated position in which a line connecting their centers is horizontal, to a position in which their "center line" is vertical. The arrangement permits use of the slits at intermediate positions as well. In all rotational positions, the center line of the slits passes through and is orthogonal to the camera axis.

The disposition of the slits illustrated in FIG. 1 is correct for studying object distortions perpendicular to the axis of the camera and in a horizontal plane. For convenience, the axis of the camera will be denominated the Z dimension; the vertical dimension orthogonal to Z, the Y dimension; and the horizontal dimension orthogonal to Y and Z, the X dimension. The illustrated disposition is suitable for studying the X distortion component of the object. If a component of distortion in a vertical plane (the Y dimension) is to be studied, then the slits 25, 26 are rotated about the camera axis so that their center line is in a vertical plane.

As noted, the object 12 whose distortion is being studied is shown supported upon a stand 13. It is centered upon the camera axis. The stand should be of high rigidity and have a fine horizontal adjustment capability. For convenience, it is desirable that the stand also have a vertical adjustment capability as shown at 30 for raising and lowering the object under study. The fine adjustments include X and Z translation screws 31 and 32 for translation in the horizontal plane. These translation devices may be of a design conventional for optical applications.

The laser illumination system 14 employs conventional optical components. It includes a laser source 33 shown supported upon the table 18 and a three element optical system for directing and expanding the illumination to cover the object. The laser produces a horizontally directed beam, generally parallel to the camera axis. The three element optical system comprises a first mirror 34 on the axis of the laser and tilted 45° to the horizontal for directing the laser beam upwardly along a vertical axis; a second mirror 35 for directing the laser beam toward the object, the second mirror being mounted for rotation about both a vertical and a horizontal axis; and thirdly, a short focus lens 36 (hidden by the mirror 35 when illuminating the object) for diverging the light from the laser so as to fully illuminate the object. The short focus lens 36 may be a microscope objective. It is supported on the upper mirror mount by means permitting rotation about the same horizontal axis as the upper mirror 35. This adjustment permits the illumination from the laser 33 to be centered upon the aperture of the lens 36 and aligned with the axis of that lens. The lens mount for lens 36 has a standard microscope thread permitting lens interchange. Longer or shorter focal length lenses may be selected depending upon the desired cone of illumination.

Prior to undertaking a description of the viewer 16, an explanation of the operation of the foregoing apparatus will be undertaken. The object 12 and the camera 11 are supported in positions convenient for imaging the object on the ground glass view finder of the camera and the laser illumination is adjusted for full illumination of the object. It will be assumed that the test object 12 is a tuning fork whose tines are to be set in vibration in the conventional pattern. The front surface of the tines of the tuning fork are oriented in a plane generally perpendicular to the axis of the system and the handle of the tuning fork is vertical. Thus, the principal component of displacement of the tines is in the horizontal plane and is the "X" component. The orientations of the object with respect to the camera should be approximate but are not critical.

Normally, the initial alignment of the camera 11, the object 12 and the laser illumination is accomplished with the slitted mask 19 removed. When the initial alignment is achieved, the mask is installed on the lens barrel and positioned so that the center line of the slits is horizontal for viewing the X component of motion.

With laser illumination still on the object, the image is viewed through the slits 25, 26 in the laser illumination and the latter is adjusted as necessary for uniformity of illumination. A photographic plate is then introduced into the field of the camera lens and the object is photographed in a static, undistorted position. The plate is then developed and the negative is replaced in the viewer.

At this point, "real time" viewing of the distorted object may take place. Thus, the object may now be struck so as to create a vibrational distortion. Viewing the moving object through the negative of the undistorted object, produces a new view of the object which is seen to contain a number of horizontal fringes or "bands" as seen at 15 in the camera viewer. The fringes occur over the moving regions of the object's image, being relatively widely spaced where the object is substantially stationary, and closely spaced where the object is in violent motion. Thus, the observer can usually determine at a glance the general mode of the in-plane vibration that has been excited in the object. He can also assess the magnitude of the horizontal "X" vibration component by a suitable count of the observable fringes. Thus, the apparatus presents a precise visual indication of the in-plane vibration.

The view of the object in motion which is presented to the observer may also be photographed by removing the negative and exposing a new plate while the object continues in motion. The effect of this mode of exposure is to photograph the device at the two extreme positions of displacement, since the dwell time is greatest there. The fringes exhibiting the displacement will then appear in the image on the photographic plate. As will subsequently appear, the photographed fringes are preferably clarified by use of the viewer 16 which is provided primarily for viewing the photographic image. In general, the fringes are of low contrast when photographed in the foregoing manner and of lesser apparent contrast than the image perceived by an observer using the view finder of the camera and a negative of the static condition.

The contrast of the photographically obtained image may be enhanced by use of the projection viewer 16. The viewer employs the laser source 33, its three element optical system, including the mirrors 34, 35 and the microscope objective 36 and a large lens 39 for illuminating the photographic plate 40. When the viewer 16 is used, the upper mirror 35 and the objective 36 are rotated into alignment with the optical axis of the viewer. The photographic plate 40 is supported in a holder 41 in proximity to the lens 39. The lens 39 gathers laser light spread by the microscope objective 37 and provides even illumination of the plate 40.

The image optics of the projection viewer includes a spatial filter 42, 43 in a holder 44 which clarifies or improves the picture contrast, and an objective lens 45 for imaging the illuminated transparency, after spatial filtering, upon the ground glass viewing screen 46. The spatial filter 42, 43 is placed at the point where lens 39 forms an image of the illuminating source. The objective lens 45 is placed near the filter 42, 43 on the side opposite to the photographic plate. The spatial filter consists of a clear region 42 to either side of the elongated rectangular stop 43. The stop 43 is oriented and dimensioned to prevent the transmission of the zero diffraction orders and low spatial frequencies while permitting passage of the first and any higher orders. As will be explained, these are orders of the diffraction fine structure, which is present in the photograph as a result of image formation through the double slits 25, 26.

The effect of the spatial filter upon the image formed in the viewer 16 is to darken the dark field regions of the photographic image, and to a lesser degree to reduce resolution in the bright portions of the image. In practice, the earlier effect is paramount and the fringes now become of substantially higher contrast. If one desires, one may photograph the image on the viewer screen 46 to record the clarified image.

The ability of the invention to display the in-plane distortion depends upon interference patterns produced from light from the two spaced slits 19 and upon a moire phenomenon when the two interference patterns are combined. Image clarification depends upon the presence of more high order light in the stationary portion of the image (or that moving integral multiples of the grating spacing) than in that which has moved a half cycle (or odd multiples of a half cycle) and which has essentially only zero order illumination or low spatial frequencies. Since the distortion produced moire image is dependent upon a light wave interference phenomenon, the smallest distortion that the apparatus can sense approaches within a factor of ten of the wavelength of light. Numerically, this smallest distortion approaches the F number of the lens times the wavelength of the light employed. The upper range of measurement is quite large, typically reaching a point of approximately a half millimeter or several thousand light wavelengths.

A more detailed explanation of the invention emphasizing the optical principles will now be undertaken. This explanation makes reference to FIGS. 2, 3a and 3b.

Figure 2:
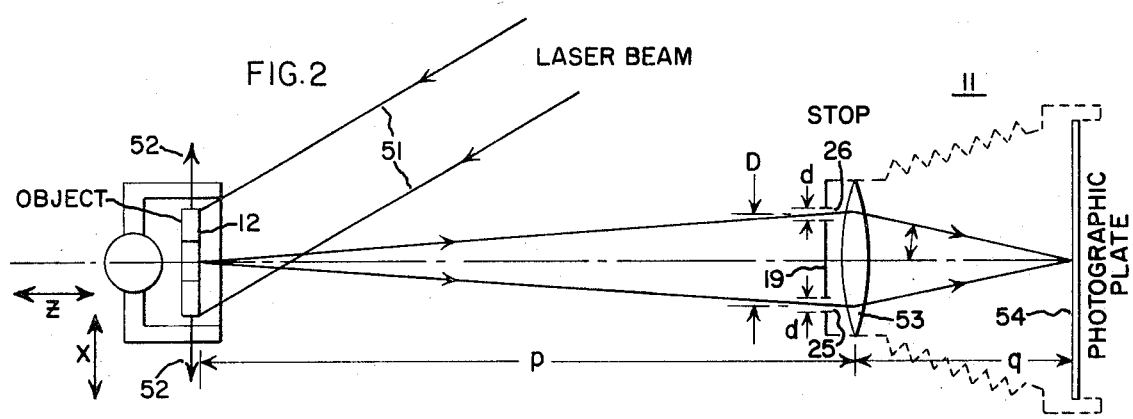
FIG. 2 is an optical schematic diagram explanatory of the operation of the embodiment of FIG. 1.
Figure 3B:
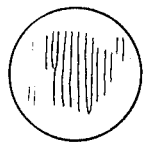
FIG. 3b illustrates the fine grating in a small element or speckle which is formed in a bright moire band on the object.

FIG. 2 is a plan view of the FIG. 1 arrangement illustrating the optical paths. The object 12 is shown illuminated by the laser beam 51. The X component of object motion is illustrated by the arrows 52. The laser beam 51 is of very narrow spectral bandwidth and while starting out as a small beam having an essentially flat wavefront, it has been made divergent before reaching the object to permit full illumination of the object. The object 12 should have a scattering surface which is not so highly polished as to interfere with imaging the illuminated surface in the camera view finder. The illuminated object is placed on the camera axis, the camera lens being shown schematically at 53. The mask 19 including slits 25 and 26 is shown in proximity to the lens 53. The photographic plate of the camera is shown at 54.

The slits 25, 26 are spaced a distance "D" apart and are each of width $d$. The object is at a distance $p$ from the lens and the image formed on the plate is at a distance $q$ from the lens. The angle formed between the camera axis and a line from the center of the photographic plate 53 to the center of the opening 25 or 26 is defined as "$\alpha$."

Let us now consider the characteristics of the foregoing arrangement. If one removes the film from the field of the lens so as to permit use of the ground glass camera view finder, and covers one or the other of the slits 25, 26, one will see a reproduction of the object 12 illuminated by the laser. If both slits are open, the picture is much the same. In all cases, the image of the object appears to be speckled, the speckles being very fine and being randomly distributed over the illuminated surface of the object.

Speckles are a phenomenon of highly coherent light. When coherent light strikes a surface, the surface appears to be speckled. These bright speckles are small regions where the light reaching an observer is of the same phase, giving the speckle its bright appearance from mutual reenforcement. Because of the finite viewing aperture, the wavefront cannot be regular over a very large region without self-cancellation, the speckles are small, and are immediately surrounded by dark regions. When imaged on a surface, the phases of the individual speckles vary in a discontinuous fashion.

When both slits are left uncovered at the same time to admit illumination, a closer examination of the individual speckles will show that they now contain a fine grating oriented in a direction parallel to the major axis of the individual slits 25, 26 (orthogonal to their center line). This grating results from interference between the coherent light from one slit with the coherent light from the other slit. The spatial frequency of the grating in any speckle imaged on the photographic plate is:

$$\delta_i = \lambda/(2 \sin\alpha) \quad (1)$$

Assuming a small angle $\alpha$, and taking the lens magnification "M" as $q/p$, then $$\delta_i = (\lambda p M/D) \quad (2)$$

The corresponding grating spacing on the object is $$\delta_o = (\lambda p/D) \quad (3)$$

This grating spacing establishes the lowest measurable distortion or minimum measurement sensitivity of the apparatus. From equation 3 it can be seen that the measurement sensitivity can be varied by varying either the separation of the slits or the object distance. Assuming a slit separation equal to the lens diameter, and a one to one object to image magnification, the grating spacing approaches $\lambda 2f$, where f is the relative aperture. The moire mechanism of sensing displacement, employs the grating spacing as the smallest unit of measure, and any measured displacement is made in integral counts of this unit. Its use requires that the grating be generally available over the image of the object.

This requires that the illumination cover the image of the object with speckles. That is to say, the speckles should be scattered over the area of interest. In the indicated arrangement, the speckles from the two slits 25, 26 are readily made substantially coincident over a substantial area of the object. Thus, the image produced upon the photographic plate contains a large number of grated speckles, each contributing to the formation of a grating structure throughout the image.

Observable displacement or distortion may now be explained. If the initial procedure is followed, a picture taken while the object is at rest, and otherwise undisturbed, will provide a very accurate photographic standard of the initial object position and configuration. The picture is developed and the negative is replaced in the back of the camera where it is used for sensing departures from the standard as the object is displaced or distorted. Assuming the camera and object to have remained in perfect mutual registry, the aerial image (which is positive) will be superimposed upon the negative and together they will produce a rather generally dark, low contrast rendering of the object. If a positive transparency is used, then they will produce a generally bright field. A displacement of the object by a half multiple of the grating interval will convert a generally light condition to a generally dark condition. Initially then, the photographic recording and the object are mutually aligned in the desired reference position. At this point, any further translation of the object permits one to count the number of changes in illumination of the image as a means for measuring any further displacement of the object.

Figure 3A:
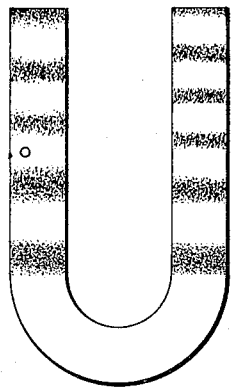
FIG. 3a is an artist's rendering of the image formed of an object being distorted, the view illustrating the moire fringes or bands over the object.

When the object is not being displaced as a unit but is rather being distorted as by forcing the tips of the tines of the tuning fork in 12 together by a clamp, the least yielding surfaces will very gradually appear to go from a dark to a light (or a light to a dark) condition. The first region to experience a half grating wavelength lateral translation with respect to an essentially stationary light region, will show a dark band through the region. Similarly, alternating light and dark bands will be formed for each region of the tine which has been displaced an additional half grating interval. This is as illustrated in FIG. 3a. Thus, by counting the number of dark bands on either tine, one may determine the number of grating intervals that the upper tip of each tine has been displaced toward the center line of the tuning fork.

Thus, each dark or light band defines a zone or contour of substantially equal in-plane X component displacements. The number of bright bands from a point under consideration to a nondistorted bright region is a measure of the X component distortion of that region in multiples of grating intervals. This technique is thus precise in showing magnitudes and it also shows the mode of deformation.

With vibratory motion, the same general principles may be applied as in static displacement or distortion. A negative of the stationary object may be introduced into the view finder of the camera as a viewing standard (or the eye static standard). Once the object is in motion visible moire bands will be created between the two sources of grated images. If the vibration is stable, or if of low frequency when unstable, the eye can then observe the banding of the regions of motion. In some applications, contrast may be enhanced by strobing the laser during the vibratory cycle.

As earlier pointed out, a direct photograph of the moving object is of low contrast, but it may be clarified in the viewer 16, which contains a spatial filter 43. The basis of its operation will now be explained. The photograph 40 is placed in the holder 41 of the viewer and oriented with the speckle gratings vertical. As previously indicated, the picture is highly speckled with the speckles being scattered over light and dark regions of the image. There will, however, be large regions between the speckles. These regions tend to produce an unmodulated background light which evens out the difference in illumination or contrast between the light and dark bands of the moire pattern. In taking a picture of the moving object, any stationary regions of the moving object will contain the grating structure to the greatest degree. This is because the gratings in the individual speckles are reproduced in a substantially in phase superposition throughout the exposure. This preservation of the grating also exists in all the speckles in the generally light regions of the moire pattern.

When the object is in vibratory motion, and the film exposed over a substantial number of vibratory cycles, the film will tend to capture the object at the two extremes of motion, the dwell times there being greatest. Thus, a region of the object where these extremes of motion correspond to a relative displacement of an even multiple of a grating spacing, will produce a composite exposure effectively making an in phase superposition of the image of these mutually displaced gratings. Thus, the speckles in the bright bands will retain a large amount of high spatial frequency grating information.

In the dark bands, those regions which have moved laterally a half grating interval and thus are dark contain the grating structure to a minimal degree. This is because the gratings of the individual speckles have been displaced (ideally) 180° and thus are cancelled in the successive period of exposure. Thus, while the dark regions will still contain some imaging of the speckles, they will lack a well defined grating and be generally deficient in high frequency content. The dark regions will also contain regions between the speckles deficient in high spatial frequency content.

This distinction in high spatial frequency content between the light and dark regions of the photograph permits one to employ a spatial filter to increase the density of the dark regions, and thus heighten the contrast of the resultant moire banding of the object. If a stop is provided which blocks zero order light or low spatial frequency light as determined by the dimensions of the slit opening used in recording the transparency from the illuminated slide, the partly darkened regions of the image will be essentially black. Due to a substantial lack of any fine structure in the dark portions of the image, there will be very little high spatial frequency light available past the stop. In the light regions, however, there will be a large amount of high spatial frequency so that by passing the first and higher order, these regions will remain light. Thus, the basic contrast between light and dark regions of the moire pattern is considerably enhanced by the spatial filtering process.

The sensitivity of the system to motion, the least and greatest measurable displacements and optimum spatial filtering are dependent upon the adjustments of the optical system. These adjustments include the dimensions of the open slits, their separation, the focal length of the lens, the size of the individual speckles, and the fineness of the optical grating. In general, these quantities are interrelated.

The width of the speckle ($\delta$) in the image plane is a variable dependent upon the aperture of the slit and the image distance:

$$\delta = (\lambda q/d) \quad (4)$$

The number of grid lines in a speckle $N$, and thus the potential moire fringes within a speckle, is $$N = \delta/\delta_l \quad (5)$$

From equations 2, 4 and 5, then $$N = D/d \quad (6)$$

Where $D$ is the slit separation, and $d$ their width.

In effect, increasing the separation of the slits in relation to their width increases the number of moire fringes that may be observed over the object.

The size of the individual speckles establishes the maximum physical displacement that can be accurately measured, since coincidence of the grating pattern is destroyed when the speckles are shifted past coincidence. The speckle dimensions may be most readily increased by decreasing the width of the slits.

Since it is normally desirable to have the ratio $D/d$ large to increase the number of available moire fringes, the diffracted orders are normally well enough separated so that a transforming lens and a separate stop are not always necessary for substantial improvement in the contrast of a photograph of the pattern. The moire pattern can in these cases be photographed or observed by merely placing a camera or the eye in the path of one of the diffracted orders. The apparatus 16 presents optimum viewing, however, since the stops can permit transmission to the imaging lens of more than a single diffracted order.

For flexibility, the projection viewer may employ a collection of stops each selected to go with a corresponding initial slit.

For the object illustrated in FIG. 3a the equipment parameters were as follows. The separation "$D$" between slits was 25 mm., the object distance was 445 mm., and the width of the apertures $d$ was 3 mm. Each fringe corresponded to an in-plane displacement of approximately 11 microns, for a total displacement of about 60 microns. The source illumination was a laser. However, because of the short coherence length required of the illuminating source, a filtered mercury lamp may also be used.

The invention may be applied to measurement of static strains or dynamic strains including those that are periodic in nature. The successive images which are superimposed to form the moire pattern may be obtained by a variety of means. The image may be obtained from a photograph and compared with an aerial image to produce real time viewing in any of the foregoing cases. One may doubly expose film for static superpositions or use strobing techniques for superpositioning in the dynamic case. In addition, where the object is in periodic vibration, one may often allow the eye to provide the image superposition.

The invention provides an extremely easily executed optical comparator. For instance, beam splitters and mirrors are not required as the illuminating source does not have to be split into multiple paths to provide reference beams or multiple illuminating beams. The measurements are independent of the direction of illumination of the object so the source may be located in a convenient position. The measurements depend only on the separation of the slits and the accuracy with which a single lens can superimpose the light from two regions of the lens in the image plane. Because the slits may be constructed of one solid piece of material and rigidly attached in close mutual proximity to the imaging lens, high mechanical stability results.

The invention thus solves most of the implementation problems which vastly complicate known interferometry equipment. It solves these problems by using the same lens for a first spatial superposition followed by a second temporal superposition. These successive superpositions require only a single illuminating light source and a single image plane and a single lens. In the spatial superposition, different regions of the same lens are employed and the accuracy of the lens sets limits to the smallest resolvable displacement. In the temporal superposition, the rigidity of the image plane and the lens and slit combination sets the limits of the smallest resolvable displacement. The initial positioning requirements are substantially non-critical since the individual path lengths and plane alignments are arbitrary and self-compensating.

What I claim as new and desire to secure by Letters Patent of the United States is:

1. The method of sensing displacement of the surface of an object orthogonal to the line of sight comprising:
   a. illuminating said object from a single source of coherent light so that when said object is imaged a speckled image of said surface is produced,
   b. providing a lens for imaging said illuminated surface in a viewing plane,
   c. masking said lens with a mask having two spaced parallel slits permitting the superposition of the speckles imaged by two regions of said lens in said viewing plane to create interference gratings having a predetermined spatial frequency within individual speckles and forming a grated speckle image in the viewing plane,
   d. obtaining two successive grated speckle images in said viewing plane at different instants corresponding to two different surface positions, and
   e. superimposing said two successive images with the gratings in individual speckles overlapping so as to form moire bands whose spacing and orientation indicates the magnitude and direction of in-plane surface displacement.

2. The method of claim 1 having in addition thereto the steps of:
   a. recording said superimposed images on a transparency,
   b. illuminating said transparency by a narrow band point source of light, and
   c. spatially filtering said illuminated transparency to remove low spatial frequency components at near zero frequency due to the spacing between individual speckles, but passing the first and higher order frequency due to said speckled gratings.

3. The method of claim 1 wherein superimposition of said grated speckle images is performed by obtaining a photograph of said object in a first surface position and viewing said object through said photograph in a different surface position.

4. The method of claim 1 wherein said superimposition is performed by doubly exposing a photographic film in said viewing plane at instants that said object is in two different surface positions.

5. The method of claim 1 wherein said object is in vibratory motion and wherein said superimposition is provided by taking a time exposure of said object through a plurality of cycles of vibration.

6. Apparatus for sensing surface displacement of an object orthogonal to the line of sight comprising:
   a. a single source of coherent light for illuminating said object so that when said object is imaged a speckled image of said surface is produced,
   b. a lens for imaging said illuminated surface in a viewing plane,
   c. a mask restricting the imaging of said surface by said lens, said mask having two spaced parallel slits permitting the superposition of the speckles imaged by two regions of said lens in said viewing plane to create interference gratings having a predetermined spatial frequency within individual speckles and forming a grated speckle image in the viewing plane, and
   d. means to superimpose two grated speckle images in said viewing plane at different instants corresponding to two different surface positions with the gratings in identical speckles overlapping, said superposition forming moire bands whose spacing and orientation indicate the magnitude and direction of in-plane displacement of said surface, said bands occurring at integral multiples of said grating intervals.

7. An apparatus as in claim 6 wherein said lens is an element of a camera, said camera including means for supporting film in said viewing plane, and a barrel for supporting said lens and said slitted mask in front of said lens.

8. An apparatus as in claim 7 wherein said means to superimpose two images comprises a shutter permitting double exposure of said film.

9. Apparatus as set forth in claim 8 having in combination therewith a viewer comprising:
   a. a holder for a transparency obtained from said camera,
   b. condensing optics for illuminating said transparency,
   c. means for directing light from said coherent source into said condensing optics, and
   d. means for imaging said illuminated transparency, including means for reducing low frequency information including the zero order of said grating image.

10. Apparatus as in claim 9 wherein said imaging means for said transparency comprises a viewing screen, a lens for imaging said transparency on said viewing screen, and a stop in the plane in which said laser source is imaged by said condensing optics for blocking the zero order of said grating image.

* * * * *